(12) United States Patent
Uhl et al.

(10) Patent No.: US 6,292,709 B1
(45) Date of Patent: *Sep. 18, 2001

(54) METHOD AND DEVICE FOR ONLINE PROCESSING OF FORWARDING MAIL

(75) Inventors: Berthold Uhl, Bermatingen; Astrid Irion, Constance, both of (DE); Walter Rosenbaum, Paris (FR)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,138
(22) PCT Filed: Oct. 10, 1997
(86) PCT No.: PCT/DE97/02326
  § 371 Date: Jul. 21, 1999
  § 102(e) Date: Jul. 21, 1999
(87) PCT Pub. No.: WO98/17405
  PCT Pub. Date: Apr. 30, 1998

(30) Foreign Application Priority Data
Oct. 24, 1996 (DE) ................................ 196 44 163

(51) Int. Cl.[7] ........................................... G06F 7/00
(52) U.S. Cl. .................... 700/226; 209/584; 209/900; 209/937
(58) Field of Search ............................ 700/226; 207/584, 207/900, 939

(56) References Cited

U.S. PATENT DOCUMENTS

| | | | |
|---|---|---|---|
| 3,651,459 | * 3/1972 | Hahn | 382/231 |
| 4,979,605 | 12/1990 | Svyatsky. | |
| 4,992,649 | * 2/1991 | Mampe et al. | 235/462 |
| 5,079,714 | * 1/1992 | Manduley et al. | 364/478.07 |
| 5,422,821 | 6/1995 | Allen et al. | |
| 5,612,889 | * 3/1997 | Pintsov et al. | 364/478.14 |
| 5,703,783 | * 12/1997 | Allen et al. | 364/478.01 |
| 5,850,480 | * 12/1998 | Scanlon | 382/229 |
| 5,910,998 | * 6/1999 | Yui | 382/101 |
| 5,936,865 | * 8/1999 | Pintsov et al. | 700/107 |
| 5,984,174 | * 11/1999 | Kato et al. | 235/375 |

FOREIGN PATENT DOCUMENTS

| | | |
|---|---|---|
| 39 43 073 | 7/1991 | (DE). |
| 0 282 357 A2 | 3/1988 | (EP). |
| 0 500 180 A1 | 8/1992 | (EP). |
| 0 589 119 A1 | 9/1992 | (EP). |

* cited by examiner

Primary Examiner—Robert P. Olszewski
Assistant Examiner—Richard Ridley
(74) Attorney, Agent, or Firm—Venable; Robert Kinberg; Catherine M. Voorhees

(57) ABSTRACT

The invention relates to a method and a device for the online processing of mail items to be forwarded. In the process, an image of the mail item is taken and the mail item is stored in an intermediate storage area. Following digitizing, the areas with interesting information are determined and forwarding instructions, names and addresses of recipients and, in the case of a return notation by a delivery person, the sender address are read automatically. The results are checked against a name address data bank and, if they do not coincide, are checked against a forwarding directory. Items that are not read clearly automatically, but for which at least one forwarding instruction exists for possible delivery locations, are evaluated with priority in a multistage video coding process by taking into account the printed-on instructions for forwarding and return. In that case, if the first video coding is incomplete, the items are again read automatically by taking into account the coding results and, if necessary, an additional video coding. The items leaving the intermediate storage area are then imprinted with forwarding instructions and distributed correspondingly.

9 Claims, 13 Drawing Sheets

ID code/barcode of sender address & optional return notice, RED, FAT PRINT:
- printed online with second printer in the OCR
- printed directly on the item
- printed over the barcode

METHOD AND DEVICE FOR ONLINE PROCESSING OF FORWARDING MAIL

BACKGROUND OF THE INVENTION

The invention relates to an online processing of mail to be forwarded and methods for improving the optical code recognition of postal addresses through use of video encoding techniques.

The automatic reading of mailing addresses with the aid of optical code recognition (OCR) is a technology representing a fixture in everyday postal life. Processing rates of up to 10 items per second (36,000 items per hour) are possible with modem address readers. The reliability of the recognition depends to a large degree on the character design and the quality of the print. If the recognition is successful, a machine-readable barcode is printed on. This barcode permits the step-by-step mechanical separation of the items until the desired sorting has been achieved. The bar coding technology in particular has made possible the step-by-step sorting (multi-pass) of the items until they are sorted in the delivery sequence of the delivery person.

However, since the reading rates are so different, the automatic operation must be supported by various manual interventions. The simplest method of processing items that cannot be read is to have them rejected in the machine and to sort them by hand, using sorting cabinets. However, the costs for this type of sorting and delivery are unreasonably high, especially with increasing personnel costs. Added to this is the fact that hand-sorted items cannot be distributed automatically in any phase. Thus, two letter flows develop, which must be combined once more at some points.

In order to avoid the disadvantages of a manual sorting of items rejected in the OCR, various approaches to the manual coding of items were developed. All methods are based on service personnel typing in parts of the address, so that the target of "providing the mail with a barcode" is reached. Once the items are provided with a barcode, they can be processed in the same way as items that are provided directly with a barcode during the OCR.

The forwarding of items is a problem that has been known for a long time. Still, the majority of items nowadays are forwarded manually.

Nowadays, items with the incorrect (old) address that are to be manually forwarded are sent to the delivery person at the old delivery area. For the delivery sequence sorting of the items, the delivery person uses a distribution cabinet, for which the number of compartments equals the maximum number of delivery points in the delivery area of the delivery person. If a forwarding request is made, a forwarding reminder card with the new address is sent to the delivery person in the old delivery area.

The forwarding reminder card is deposited in the respective compartment. During the delivery sequence sorting, forwarding mail in compartments with forwarding reminder cards are not sorted in. Instead, the delivery person writes the new address onto the envelope and hands the mail over to the manual-processing location.

In systems that have been modified, the delivery person identifies letters that must be forwarded, removes these letters from the flow of letters and sends them to a central location for processing letters to be forwarded. With the aid of extraction techniques, service personnel will input the incorrect address into a computer that is connected to a central data bank. The data bank contains information on all forwarding requests and displays on the screen the new address as well as a list of names of persons who have placed forwarding requests. The service personnel then search the list for the name on the envelope. As soon as this has taken place, a new label with a new address is applied either automatically or manually. The label in this case is positioned such that the old barcode is covered. As a result, the letter can once again be read and coded automatically, along with the remaining items. The disadvantage of this method is the high manual expenditure for the processing and the fact that items to be forwarded must be separated from the normal letter flow. This results in delays and detours for items to be forwarded. (Computer Forwarding System II of the USPS).

More advanced systems use the OCR technology. In that case, items to be forwarded are again intercepted by the delivery person, are provided with stamps such as "moved, address unknown," and are sent to an automatic forwarding center. The forwarding center is provided with address readers, which automatically detect the address of the sender and that of the recipient for all items to be forwarded. The new address is determined with the aid of a forwarding data bank. The address reader can read and evaluate all comments by the delivery person, advance instructions and other features. The evaluation of the features makes it possible to decide on what to do with the items. In another automation step, a label with the new address is affixed to the mail. After the barcode has been printed on as well, the mail is again inserted into the regular flow of letters for delivery.

The U.S. Pat. No. 5,422,821 discloses a system for forwarding incorrectly addressed items, which detects items to be forwarded in an earlier stage of the letter processing and differentiates between items that can be read by a machine and those that cannot be read by a machine.

After taking a picture of the address side of the mail, including the digitizing, the name and address of the recipient are read by means of an OCR reader. Following that, the ZIP code of the distribution location is determined in an USPS ZIP+4 database. Subsequently, it is determined in an USPS National Change of Address (NCOA) database whether any forwarding requests have been entered. At the same time, written forwarding instructions on the items are evaluated automatically. During the time required for determining the correct address, the items are located in a mechanical delay loop/intermediate storage. If the address, including the ZIP+4 Code cannot be determined automatically during the time the respective mail spends in the delay loop, the images are stored with an identification number. This ID Number is subsequently printed onto the mail as a barcode and the further processing occurs off-line with the aid of video coding in the above-described manner, wherein these items must be removed from the flow of items and collected in a special sorting compartment. If the correct address is determined during the time the respective mail spends in the delay loop, then a label is applied to the incorrect address, onto which the new address is printed. A barcode sorter subsequently distributes the items on the basis of the printed-on new barcode. This operation takes place on line.

SUMMARY OF THE INVENTION

The present invention is based on the problem of incorporating the video coding technique into the OCR reading technique to increase the number of items that can be processed on line. This should occur in such a way that during the time the items spend in a delay loop, additional items that cannot be read by means of the OCR reading technique can be evaluated. Whether and to what location a mail item must be forwarded follows from the forwarding inscription or the name-related and delivery-location related forwarding directories.

The advantages achieved with the invention in particular are that names and addresses of recipients, which cannot be recognized automatically by means of the OCR reader, can be incorporated into the online processing as a result of the prioritized video coding according to the invention of the items to be forwarded. Further advantageous embodiments of the invention follow from the dependent claims.

The multistage incorporating of the video coding into the automatic OCR reading process, permits a quick recognition of names and addresses with an effective use of the video coding personnel. This process becomes particularly advantageous through the effective use of extraction coding and the selection coding, which makes it easier to reach decisions for the video coding personnel.

In order to improve the reading rate, other advantageous embodiments according the invention provide that even in cases where the automatic reading of forwarding and return instructions or sender addresses is not very clear, the items are sent to a video coding.

BRIEF DESCRIPTION OF THE DRAWINGS

In the following, the invention is described in further detail with the aid of the drawings.

Shown are in.

DETAILED DESCRIPTION OF THE INVENTION

Figure 1:
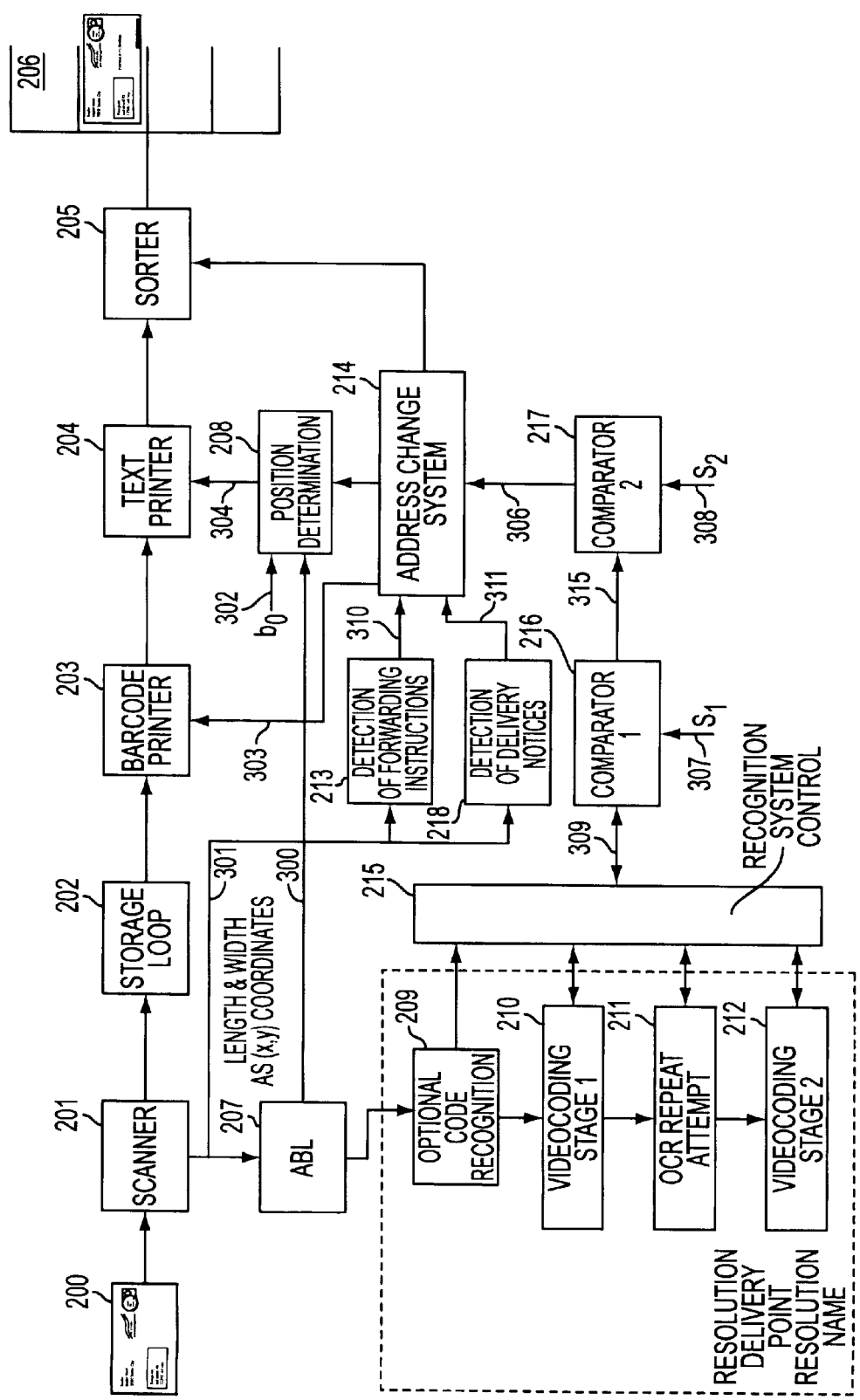
FIG. 1 An operational block diagram for the online processing system.

According to FIG. 1, the reference number 200 designates mail, e.g. an envelope, which is checked to determine whether it must be forwarded or sent back. A gray-key scanner 201 optically scans the envelope surface and prepares the scanned image for the subsequent steps of "optical code recognition" (OCR) and "representation at a video coding station." Following that, the scanner sends the image 301 to the address block determination (address block location (ABL)) 207, a detector for advance instructions 213 and a detector for delivery instructions 218. The mail itself is buffered physically in a delay segment 202 of the address reader.

The address block locator (ABL) 207 determines the position and dimensions of the address block. The pixel image of the discovered address block is transmitted to an optical code recognition 209, which converts the pixel image into a string of codes with credibility evaluations and alternatives for the individual codes. All text parts of the address, which are necessary for the determination of a delivery location, are detected. A recognition system control 215 transmits the recognition results 309 to a first comparator 216, which improves the recognition results by using contextual knowledge 307 of all possible addresses from a name address data bank, also called a dictionary. If a successful comparison with the dictionary is not possible, the address block is forwarded to the video coding.

The code recognition system is supplemented by an online video coding system with 3 different phases:

Phase 1: video coding, first stage 210:
    The video coding operator inputs a short, easily recognizable extract with fixed length, which resolves the departure information and a portion of the arrival information. If an unambiguous dictionary comparison is possible with this extract, then the address is resolved up to the delivery location.

Phase 2: OCR repeat attempt 211:
    For addresses where the extract allows more than one dictionary entry as correct resolution, the code recognition is started again with the additional knowledge obtained in the video coding stage 1. This additional information decisively increases the probability of a correct OCR decision during the $2^{nd}$ attempt.

Phase 3: video coding stage 2 (also called selection phase) 212:
    The addresses, which are not clearly resolved following the repeat OCR attempt, are locked onto a video coding station together with the possible, correct dictionary entries. The video coding personnel is urged to make the final decision by depressing a key.

A recognition system control 215 monitors and controls all necessary interactions between the optical code recognition and the video coding system.

After passing through the optical code recognition and possibly also through one or several phases of the video coding system and following a dictionary comparison, the delivery location for the mail to be checked is known. As soon as the delivery location has been found, the signal 315 is transmitted to a second comparator 217. As a result of signal 308 from a forwarding directory, the second comparator has all the information with respect to the forwarding requests (respectively with the new and old address). If it detects a forwarding candidate in the mail to be checked, then a signal 306 is transmitted to an address change system 214.

Other signals are also transmitted to the address change system: A delivery instruction 218 detection system detects the imprints of the return stamps, used by the delivery persons and transmits a signal 311 if such a stamp is recognized. A device for detecting advance instructions detects such advance instructions as "please return to sender if recipient has moved," and sends a signal 310 to the address change system 214 if an advance instruction is detected. For a return of the mail, it is also necessary to read the sender address. This task is taken over by the optical code recognition and the video coding system.

The address change system 214 determines the target address for the mail to be checked on the basis of the signals 306, 310 and 311. If the mail is to be forwarded, then the target address is the new address of the recipient. For a return, the address of the sender is the target address for the mail. The target address 303 barcode is affixed with a barcode printer 203 to the mail. In addition, a forwarding instruction and the new address, or a return instruction are printed with a text printer 204 in clear text onto the mail. A position determination 208 determines the position of the instructions and additionally of the new address only if the mail is to be forwarded. The position determination is provided by the address block determination 207 with information on the length, width and positioning of the address block on the mail (signal 300) as well as the dimensions for the mail itself 302. It transmits a signal 304 to the text printer, which designates the position of the text to be printed on. Normally, the text is printed to the right or left of the (old) receiver address. In order to emphasize this text, it is printed in bold letters and the color red. The delivery person should be able to read the printed on text even if the mail has a background pattern at this location.

Subsequently, the mail is sorted according to its target address 205 and is transported to the respective rough distribution compartment 206.

In general, items that do not need to be diverted (forwarding or return) are only imprinted with the target barcodes.

All processes described so far are carried out while the mail is located in the delay loop of an address reader. For that reason, a significant number of items can be processed online and, if necessary, also diverted.

Figure 2:
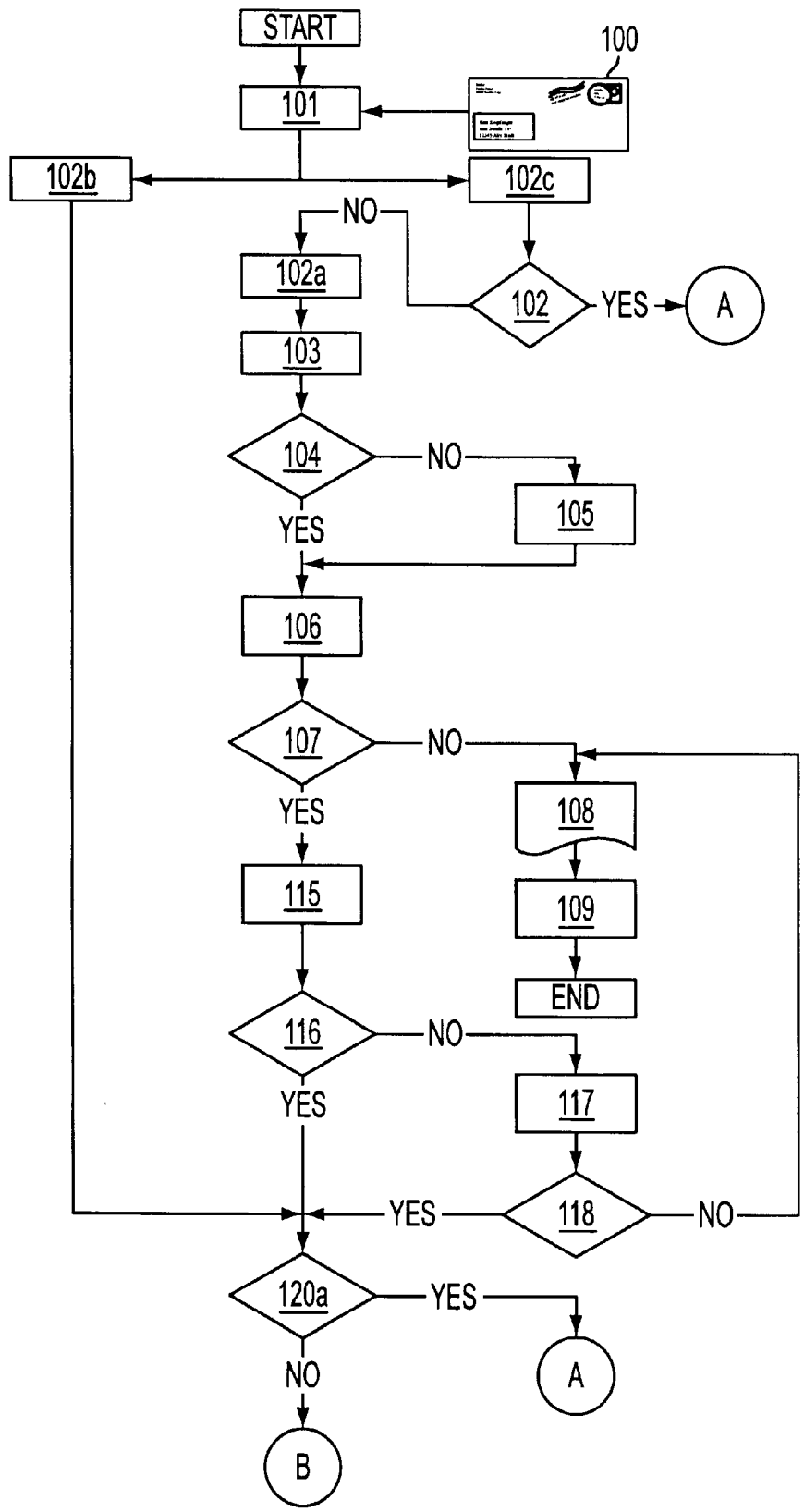
FIG. 2 A flow diagram of the operational sequence of the online processing systems (part 1)
Figure 3:
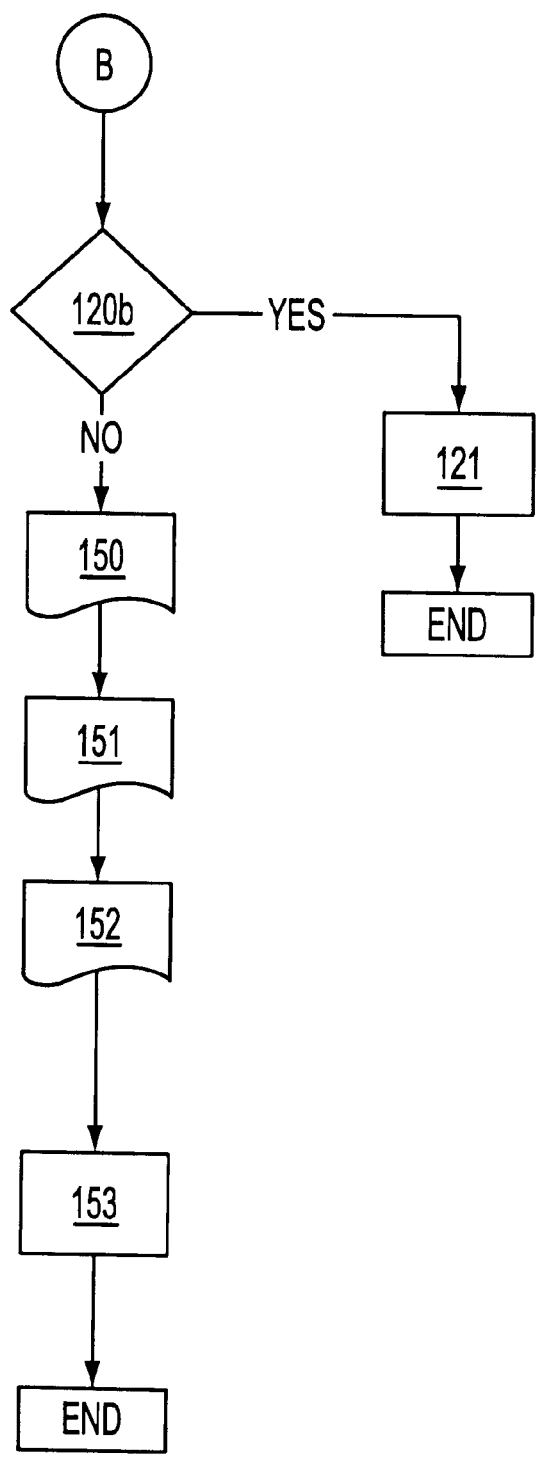
FIG. 3 A flow diagram of the operational sequence (part 2)
Figure 4:
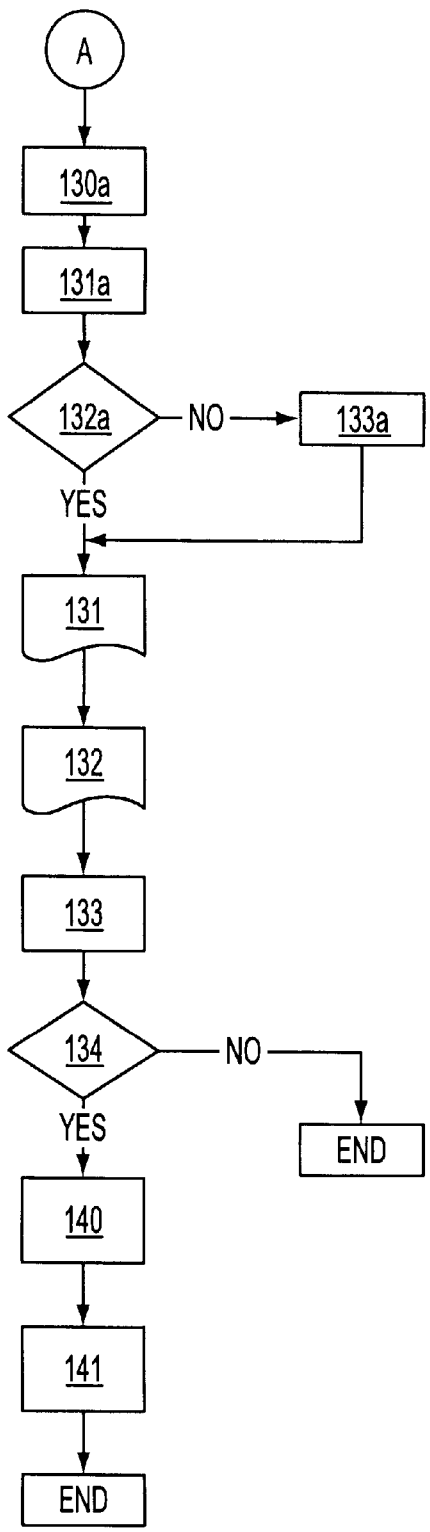
FIG. 4 A flow diagram of the operational sequence of the online processing system (part 3)

The related FIGS. 2, 3 and 4 provide a detailed overview of the processing sequence for the automatic processing of items to be forwarded and returned. A mail item 100 is scanned during the processing step 101. The scanned image is transmitted to the device for detecting advance instructions 102b and to the device for detecting delivery instructions 102c. If a delivery instruction is detected, then a processing step for the return is implemented. If no delivery instruction exists, the pixel image is transmitted to the image recognition 102a. The complete address information, including the delivery location and receiver name, are detected therein.

In order to improve the reading result, context information is used for the subsequent dictionary comparison 103. The dictionary contains all address information up to the individual delivery locations. If the comparison with the dictionary 104 does not provide a clear result, the missing information is supplemented with a 3-phase video coding 105. With the aid of the delivery location, determined in this way, it is determined in a forwarding data bank 106 whether at least one forwarding inquiry 107 exists at this delivery location. All possible, correct and different spellings of the addresses are stored in the dictionary as well as in the forwarding data bank, so as to ensure the highest possible recognition rate.

If the delivery location to be examined does not contain a forwarding request, which is the case in about 95% of the time, the target address is affixed in a step 108 in the form of a barcode onto the mail, and the mail is sorted according to its target address 109.

In the other case, that is if the delivery location has at least one forwarding request, the name of the recipient must be identified. For that purpose, the forwarding data bank contains a complete list of the persons associated with this delivery location. The name read by the code recognition system is compared in step 115 to the list of names from the forwarding data bank. Once the (recognized) name of the recipient is found in the forwarding list 116, possible advance instructions are considered during the subsequent step. The recognition of these advance instructions 102b takes place parallel to other processes, such as code recognition and access to the dictionary. However, the results of this recognition are evaluated only if a mail item was recognized as mail to be forwarded. The recognition of the advance instructions is important, particularly since in many countries the majority of items are not forwarded if there is a change of address, but must be returned to the sender (especially large-scale senders) since the senders want to take care of their address data banks.

The first advance instruction that is checked is "return to sender." For this, the recognized text is compared 120a to a list of permissible advance instruction texts. If the mail must be returned, it is treated as shown in FIG. 4. If the mail must be forwarded, it is treated as shown in FIG. 3.

FIG. 3

Forwarding of items:

If the mail is provided with an advance instruction of the type that has "do not forward—destroy the mail" printed on it (e.g. for information mail in Germany), this is detected by comparing the recognized advance instruction text to a list of permitted texts 120b. In that case, the letter is sent to a manual processing 121.

If no advance instruction was detected, the mail is forwarded. For this, the barcode of the new recipient address is printed on as target code 150 and an instruction to forward the mail 151, as well as the new address 152, are printed on as clear text. The mail is then sorted in step 153 according to the new address.

FIG. 4

Returning the mail:

If a mail item has been identified as return mail through recognition of an advance instruction or a delivery notation, the sender address must be read in step 130a. A dictionary comparison 131a takes place after that. If no clear recognition result for the sender address 132a exists, the recognition is supplemented through video coding 133a. As soon as the sender address has been identified successfully, it is affixed in step 131 to the letter in the form of a barcode as the target code. Furthermore, a return notation and—if known—the reason for returning the mail are printed in clear text 132 onto the mail. The mail is subsequently sorted in step 133 according to the sender address.

In addition, the sender address and the new, as well as the old recipient address 140 of each return mail are entered into the data bank. Address change reports are regularly compiled in step 141 and sent to the customer if the customer (sender) desires this in decision 134, thus allowing the sender to cultivate his/her address list.

Figure 5:
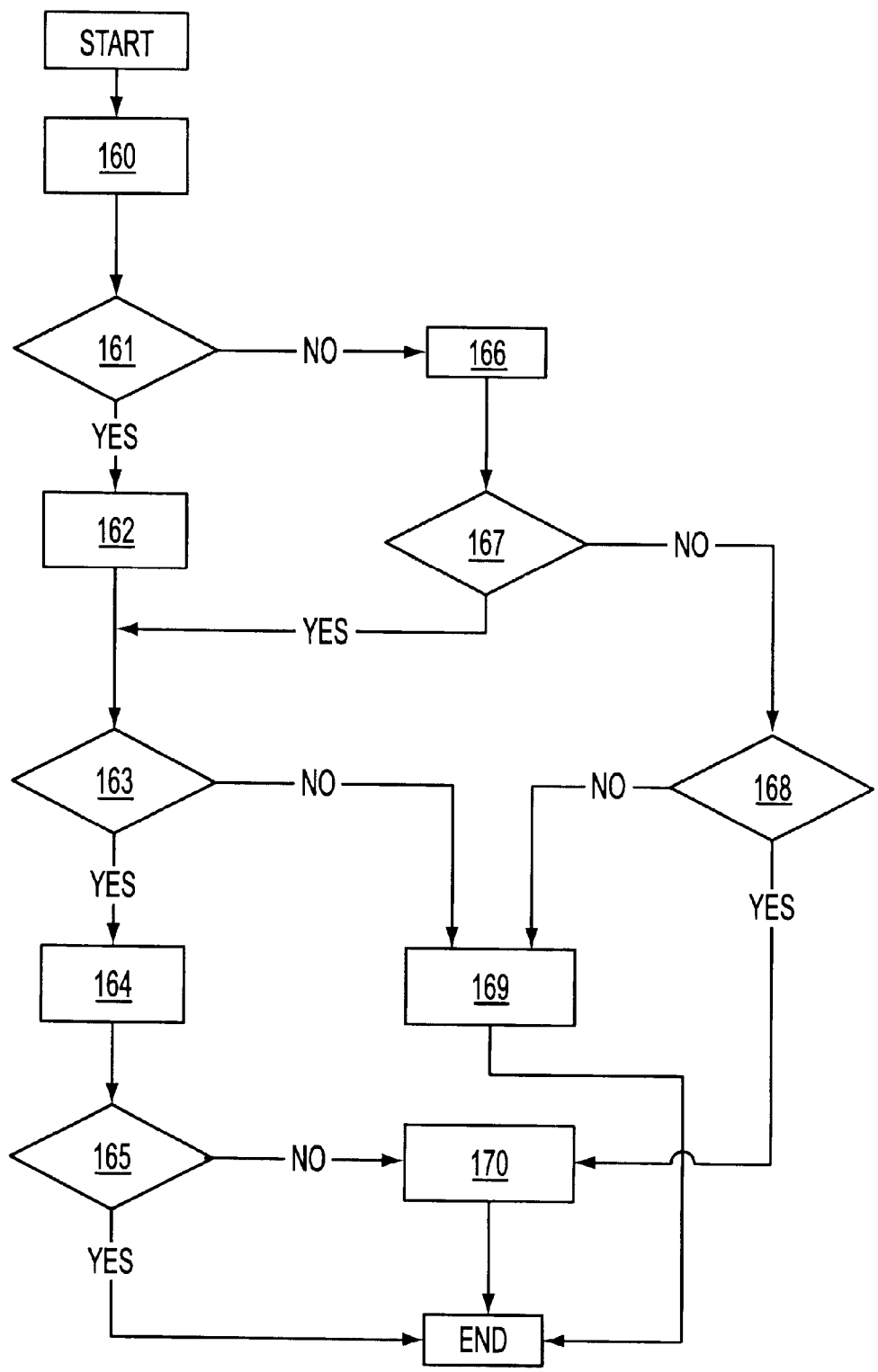
FIG. 5 A flow diagram of the operational sequence of the online processing system (part 4) for the video coding.

The FIGS. 5 and 6 again provide a detailed overview over the 3-phase video coding previously mentioned in connection with FIG. 1:

Rejected items (rejects) cause increasing difficulties for the forwarding or return process. The goal is to resolve rejects whenever possible online, meaning while the mail is still located in the delay loop. If this should not be possible, it must be ensured that any related offline process is completed before the mail leaves the discharge center.

For that reason, the code recognition system (OCR) is connected seamlessly with a 3-phase video coding, as shown in FIG. 5a.

(1) If a clear OCR result does not exist, the missing information is supplemented in a first stage of the video coding through the input of a so-called accelerator keying sequence AKS 160. An AKS is a short, easily recognizable extract with fixed length, which resolves the outgoing and a portion of the incoming address information. If the AKS only leads to the conclusion 161 of a dictionary entry, then this result is validated with the OCR 162. With this, the location for delivering the mail is known and this result is sufficiently secured. If forwarding requests 163 exist for this delivery location, an attempt to determine the name of the recipient 164 is made with the aid of the intermediate results from the OCR. If the name can be recognized 165, then a decision can be made as to whether the mail should be forwarded or returned.

(2) If the AKS would permit several dictionary entries as result, an attempt is made to resolve this ambiguity with the aid of an OCR repeat attempt 166. If this attempt should prove successful 167, then the operation continues as described in the above under mail (1).

(3) If a forwarding request exists in mail (1) for the delivery location to be considered, but the name of the recipient cannot be read 165 or if the OCR repeat attempt in mail (2) has not produced a definite result and one or several of the possible results, in this case meaning delivery locations, have a forwarding request 168:

(4)→ then a priority for resolving this reject and thus also for resolving/processing a possible forwarding return 170 is transmitted to the online video coding location for selections.

(5) In the other case (if this is definitely not a forwarding candidate), the video coding order is started with a low priority in step 169.

Figure 6:
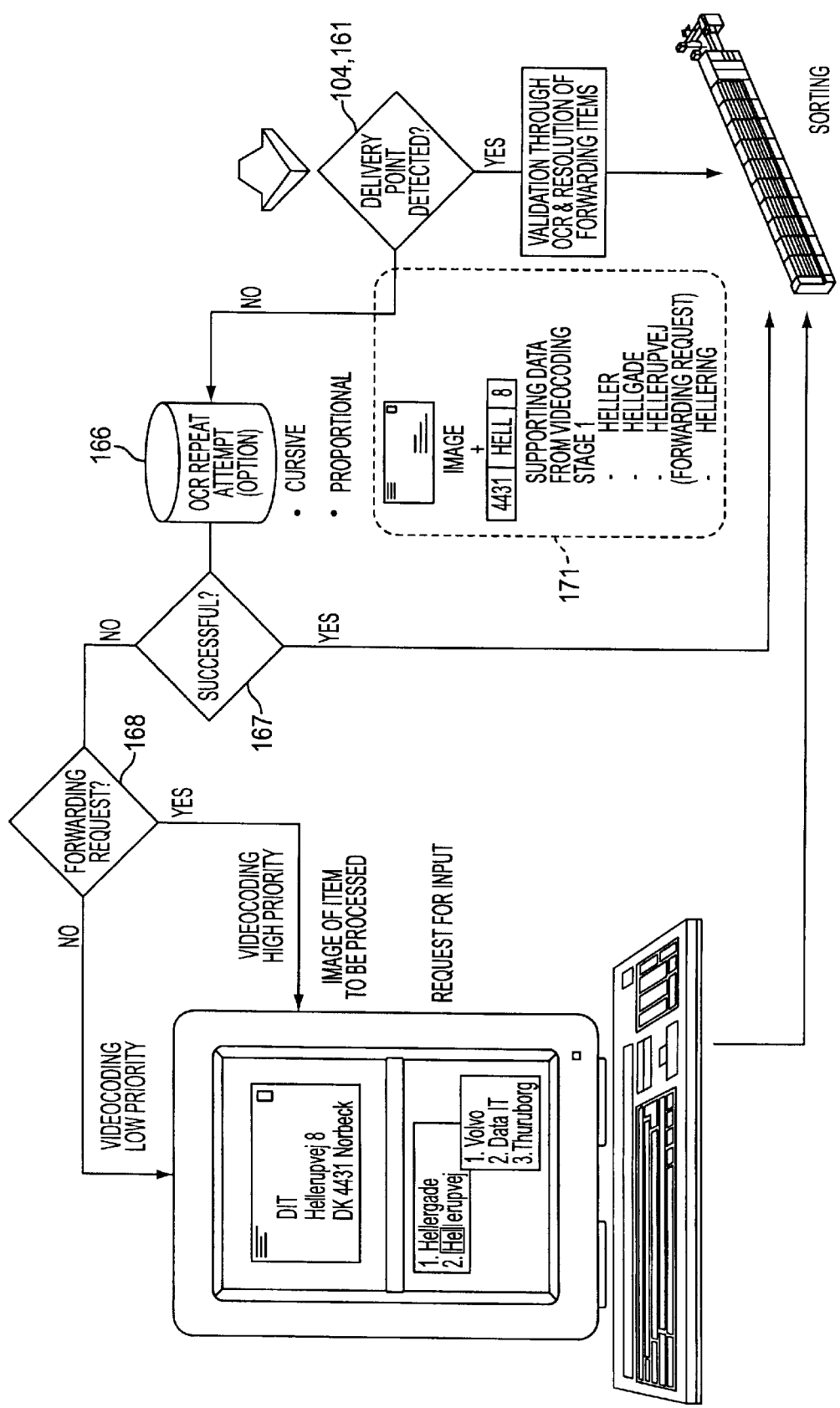
FIG. 6 An overview of the data flow during the multistage video coding (phase 3)

The phase 3 is explained in further detail with the aid of FIG. 6.

A decision 104, 161 must be made in this case whether a complete evaluation of the address information of a picture has occurred during the video coding. If the decision is positive (Yes), then, in case of forwarding instructions, the corresponding mail can be provided with a barcode following the reading of the recipient name and a comparison with the forwarding directory. The mail is then sorted further with standard means. In case of a negative decision (No), the invention provides for a further automatic evaluation by using the results of the video coding 166. It means that during this further automatic evaluation, the information gained through video coding along with the information shown on the image are available to the OCR processor. In the above example, this is the triple information "4432," "Hell," "8." In FIG. 6, this is expressed symbolically by the content of the circle 171. Following this, a decision 167 is made on whether a complete evaluation of the respective image has actually taken place. In the positive case (Yes), the respective information is used for a further sorting of the mail, in the same way as after a positive decision at decision point 104, 161. If the decision is negative (No), another video coding with high priority for forwarding requests and low priority without forwarding requests, the decision 168, takes place using the results of the further automatic evaluation. In that case, a number of alternatives for selection are presented to the operator, from which a selection must be made.

If the new address cannot be determined in the time interval during which the respective mail is buffered in the intermediate storage, then an identification (ID) code is printed onto the mail with the printer, so that the mail can continue to be processed offline. This occurs with high priority.

The key factor with respect to time is that all items to be forwarded or returned are resolved before a mail item leaves the departure center. Other, simpler forms of video coding can be used for rejects that under no circumstances can be candidates for forwarding since a use of the transporting time to the video coding cannot be the cause of physical detours for these items.

Figure 7:
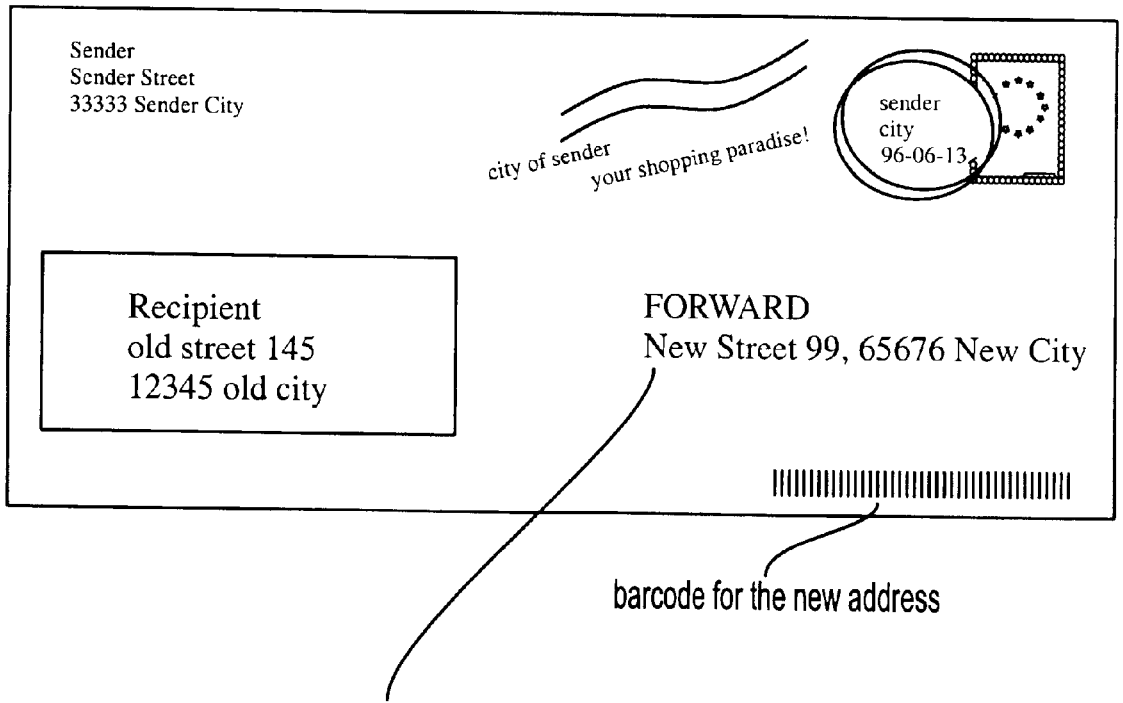
FIG. 7 A letter to be forwarded.

FIG. 7 shows a letter, which is to be forwarded following processing with the online system for the automatic processing of items to be forwarded and returned. The barcode affixed to the mail contains the new address of the recipient as target address. The forwarding instruction (e.g. "forward") and the new address, comprising street, house number and possibly apartment number, zip code and, if there is sufficient space, also the name of the location are printed to the right or left of the old address.

This information is printed directly onto the mail either online in the OCR or in a sorting machine. It is printed on in bold, red type, which can still be read by the delivery person even if the background of the mail is restless.

Figure 8:
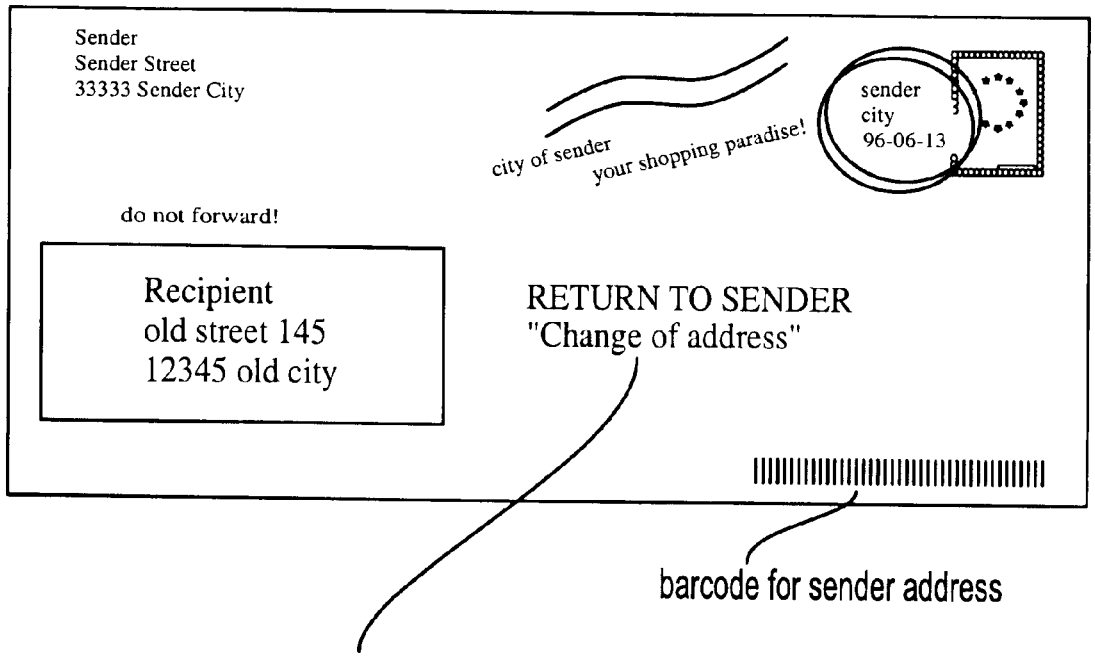
FIG. 8 A letter to be returned to the sender.
Figure 9:
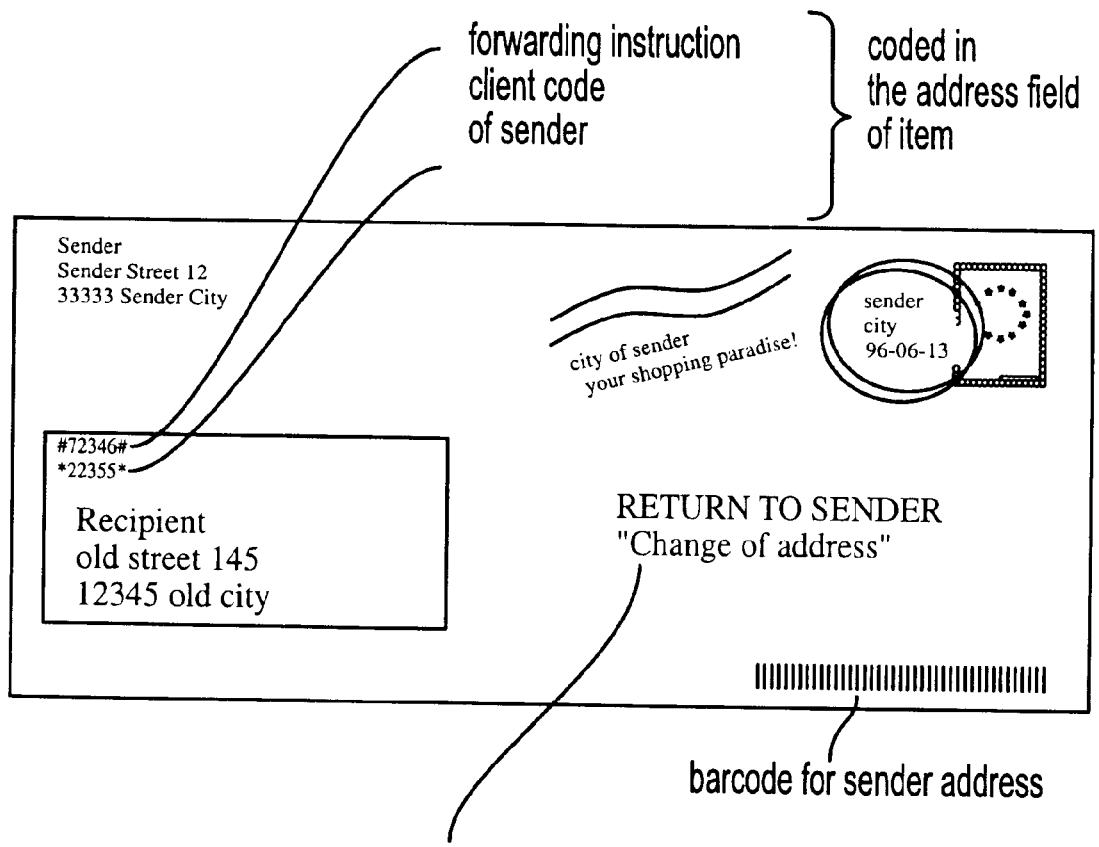
FIG. 9 A letter to be returned to the sender where the sender has printed his/her postal customer number and advance instruction encoded into the address field for the recipient.

FIGS. 8 and 9 show a mail item to be returned following processing in the online system for automatic processing of items to be forwarded and returned. The barcode affixed to the mail contains the sender's address as the target address. The return notation (e.g. "return to sender") and the reason for the return (e.g. "address change") are printed on to the right or left of the old address. The sender address itself is not printed on again. It must be affixed to the mail by the sender him/herself in a form that can be read by humans if advance instructions are used. The information is printed directly onto the mail, online in the OCR. The print is bold and in red, making it possible for the delivery person to read it even if the mail background is restless.

The items in FIGS. 8 and 9 differ in that on the mail in FIG. 9, the sender him herself printed on his/her customer number at the postal service and the type of advance instruction as code in the address field above the recipient address.

The processing of such a return mail is considerably simpler than that of a mail item with "normal" advance instruction, as described in connection with FIG. 2:

The search based on the ROI "sender address" (ROI= regions of interest) and the reading of the sender address can be dropped. Instead, only the customer number of the sender is read as the top line in the address field.

The parallel processing "detection of the advance instruction" is dropped. The type of advance instruction is simply read with the code recognition system as the line below the top line in the address field.

The return of a mail item prepared in this way requires much less time and resources than that of a normal mail, inscribed with advance instruction text and sender address.

The preconditions for using a coded sender address and advance instruction are:
1. An agreement between the postal service and the customer: The customer is accorded a customer number.
2. A customer data bank at the postal service.
3. A list with permissible codes for possible advance instructions.
4. The coding of customer number and advance instruction in the address field, above the recipient's address.

5. The affixing of a sender address that can be read by the delivery person, so that the delivery person can deliver the return.

Figure 10:
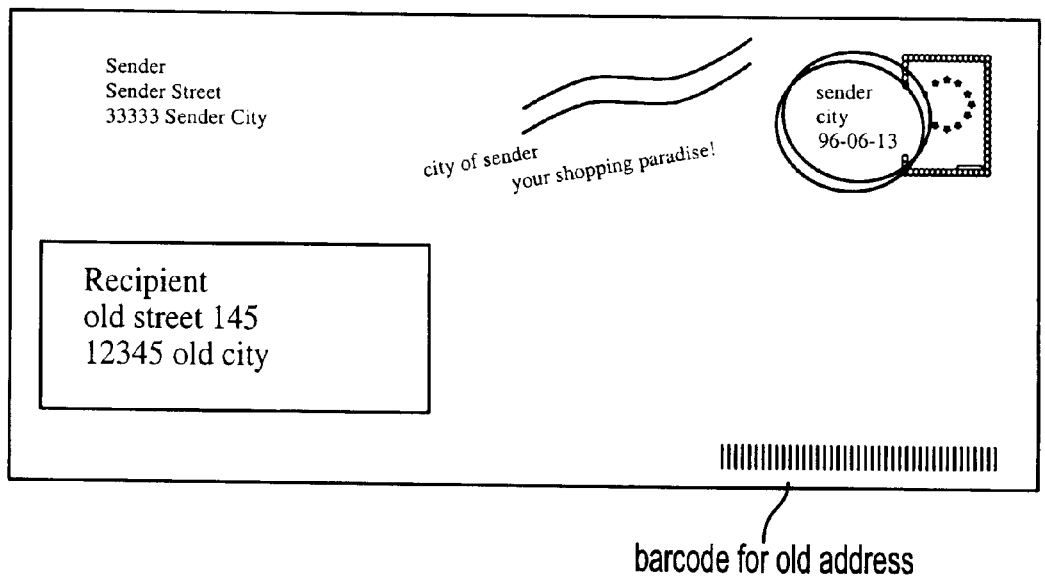
FIG. 10 A letter, which was not recognized as letter to be forwarded when the mail arrived.
Figure 11:
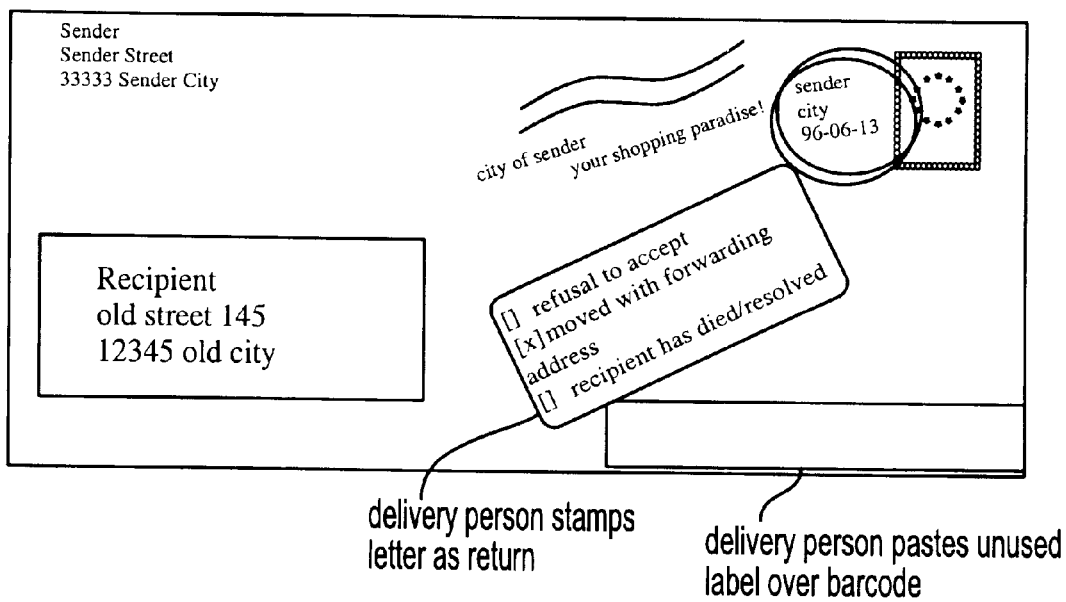
FIG. 11 A letter according to FIG. 10, stamped for return by the delivery person, with an empty label above the barcode.
Figure 12:
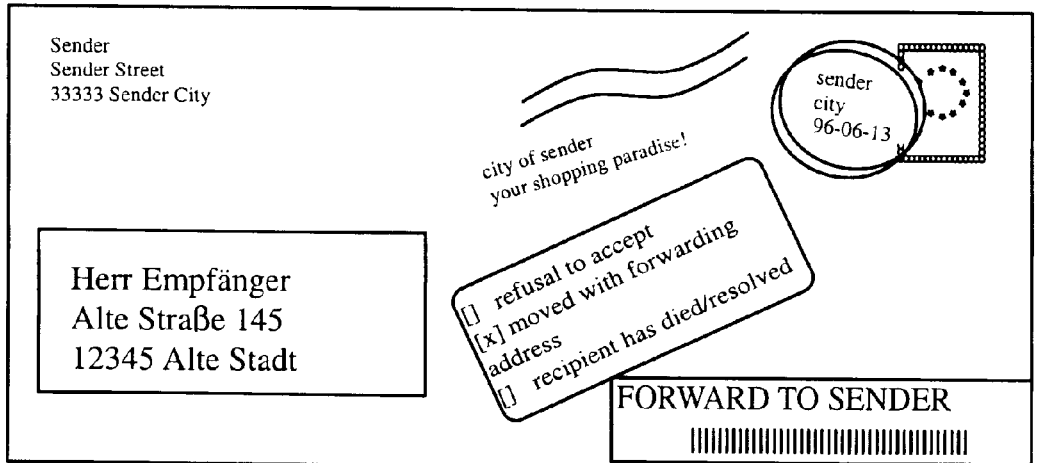
FIG. 12 The letter according to FIG. 11, following treatment in the system according to the invention.

The FIGS. 10, 11 and 12 demonstrate the treatment of a return based on a delivery instruction.

FIG. 10 shows a letter, which was not recognized in the online system for the automatic processing of items to be forwarded or returned as a candidate for forwarding or return because no information on an address change was available to the system. The barcode for the address, recognized as correct, was therefore printed onto the letter and it was sent to the delivery person responsible for the former residence of the recipient. The delivery person only can determine that:

the recipient refuses to accept;
has moved, address unknown;
has died or is resolved.

As shown in FIG. 11, the delivery person therefore stamps the letter as return (affixing a delivery notation) and manually marks the reason for the return. An empty label is pasted over the old barcode, which is thus made unrecognizable. In this way, the letter can be processed further by machine instead of by hand. The delivery person will send it directly to the office of origin sorting.

FIG. 12 shows the same letter following processing by the online system for the automatic processing of items to be forwarded and returned. The detection of the delivery instruction has recognized the return stamp from the delivery person and has sent the mail to the return processing (as described in FIGS. 2, 3 and 4). There, the barcode for the sender address and the return instruction "return to sender" (optional, in bold red text) are affixed online in the OCR onto the empty label.

Figure 13:
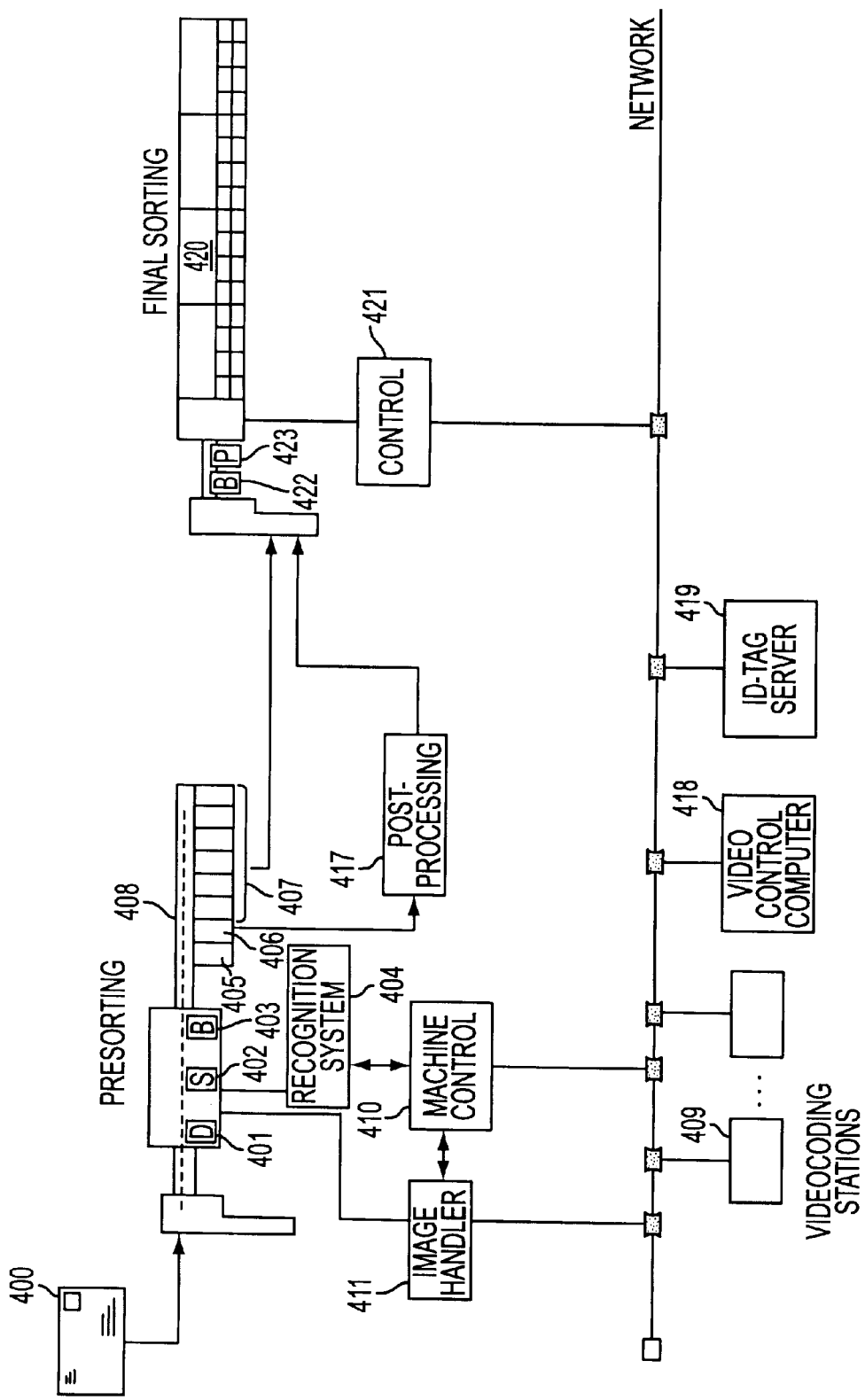
FIG. 13 A block diagram of the machine configuration for the online system.

FIG. 13 illustrates the machine configuration for the online system for the automatic processing of items to be forwarded or returned. A mail item 400 is fed into an integrated address reading and video coding system, here referred to as "presorting." In this machine, it is scanned with a highly developed scanner 402 after it has passed by the pre-barcode detector 401. The scanned pixel image is sent to the recognition system 404, for which the task and function were described in detail in the preceding explanations. The recognition system is supported by a video coding system where video-coding personnel at video coding stations 409 either input the address information or make selections from lists with alternatives. A video control computer 418 controls the transmission of images from the recognition system to the video coding system, as well as the return transmission of the coded results to the machine control 410, to permit the imprinting of the items with the target barcode 403, as well as the sorting into the correct rough sorting compartment 407.

Items which cannot be evaluated online during the intermediate storage will be imprinted with an ID-tag (with the barcode printer 403), which is stored in the ID-tag server 419, together with the sorting code information, the complete address block information and the information on possibly existing delivery notations or advance instructions.

The rough sorting compartments 407 contain items with correct addresses as well as items that must be forwarded or returned, for which the addresses could be corrected with the online system for the automatic processing of items to be forwarded and returned. This flow of letters moves directly into the next processing stage, which is generally the final sorting stage.

In the detailed final sorting machine, here referred to as "final sorting," the barcode of each mail is read with a barcode reader 422. Once a target code is recognized, the mail is moved directly to the associated final sorting compartment 420. If an ID-tag is recognized, then an ID-tag request is sent to the ID-tag server 419. Following such a request, the server transmits the necessary sorting, address and other information, stored under this ID, to the control of the final sorting machine 421. The mail to be forwarded is imprinted with the notation "forward" or "back to sender," the new address or the reasons for the return. This is done with the aid of a text printer 423 in the detailed final sorting machine. Subsequently, the mail is selected and moved according to the target information to the corresponding final sorting compartment 420.

A small number of items that could not be identified online are moved to a special rough sorting compartment 406 during the presorting. These items are marked with an ID-tag. The pixel images of these items are stored in an image handler 411 and are subsequently sent with highest priority to the video coding. The results from the video coding are stored under the ID-tag in the ID-tag server. The items are then again moved to the presorting, which selects them to be moved to the respective rough-sorting compartment following an ID-tag query to the ID-tag server. Following that, they can be moved with the normal flow of letters to the final sorting stage.

To be sure, items that carry a delivery notation (identified by the delivery person as return items and marked with a "return to sender" stamp), but which have not yet been given a barcode, cannot be processed further. They must be moved to a special Rough sorting compartment 405.

What is claimed is:

1. A method for online processing of items of mail to be forwarded, including the following online processing steps:
    a. making an image of a side of respective mail items that contain information including names and addresses, and transporting the items to an intermediate storage;
    b. digitizing and storing the respective images,
    c. determining areas containing interesting information, including sender name and sender address, receiver name and receiver address, and instructions for forwarding or returning the respective mail items;
    d. classifying areas containing interesting information,
    e. automatically reading in of instructions for returning or forwarding of mail items and reading of recipient name and address by means of an OCR reader, including automatically checking of results in a name address data bank and, in case they do not coincide, in another data bank where forwarding requests relative to delivery points are stored, wherein only the sender address is read in case of determination of a return notation made by a delivery person on the mail item;
    f. online evaluating recipient names and recipient addresses that are not clearly read by the OCR reader, including checking the name/address data bank, and the data banks for forwarding with the aid of video coding of the images of each item of mail for which at least one forwarding instruction exists for possible deliver points, by taking into account the forwarding or return instructions;
    g. printing, legibly and encoded, a new recipient address, and forwarding instructions on the mail items leaving the intermediate storage; and
    h. distributing the mail items according to the new address and the forwarding instructions.

2. The method according to claim 1, wherein coding according to predetermined rules takes place during the first video coding.

3. The method according to claim 1, wherein a selection coding takes place during the additional video coding, in such a way that a selection is made from unclear results of the coding.

4. The method according to claim 1, further including supplying a return instruction to the video coding in case return instructions from a postal carrier cannot be read with certainty by means of an OCR reader.

5. The method according to claim 1, including supplying a sender address to the video coding if it cannot be read automatically and with certainty by means of an OCR reader.

6. The method according to claim 1, including imprinting advance instructions by the sender, and one of the sender address and customer number onto a recipient address field in addition to the legible information.

7. A device for carrying out the method according to claim 1, comprising:
   a device for generating and storing images of items;
   an OCR reader for automatic evaluation of information on the items, the automatic evaluation including a result of checks in a name/address data bank and a forwarding directory;
   a device for video coding the mail images, said device having a plurality of video coding stations, including means for checking the results of a comparison of the image information in the name/address data bank and the forwarding directory;
   an image controller for controlling the flow of data between the device for the automatic evaluation and the device for video coding, the image controller supplying, during the video coding, images of the items not identified with certainty to the OCR reader for further automatic evaluation by using the results of the video coding, wherein the images of items for which possible delivery points for at least one forwarding instruction exist are supplied first to the device for video coding;
   a printing device for printing on addresses in legible and encoded forms, and for printing on forwarding instructions;
   an intermediate storage; and
   at least one sorting device.

8. A method according to claim 1, comprising the following processing steps for realizing the video encoding of the processing step f:
   transmitting the images of the items, not read with certainty in the automatic OCR evaluation, to a first video coding;
   feeding of those images, which were not evaluated with certainty during the video coding, to another automatic evaluation in the OCR reader by taking into accounting the results of the first video coding; and
   evaluating images of items not evaluated with certainty during the further automatic evaluation, said items containing at least one forwarding instruction for possible delivery points, during another video coding by using the results from the additional automatic evaluation.

9. A method for online processing of items of mail to be forwarded, including the following processing steps:
   making an image of a side of respective mail items that contain information including names and addresses, and transporting the items to an intermediate storage;
   digitizing and storing the respective images,
   determining areas containing interesting information, including sender name and sender address, receiver name and receiver address, and instructions for forwarding or returning respective mail items;
   classifying areas containing interesting information;
   automatically reading in of instructions for returning or forwarding of mail items and reading of recipient name and address by means of an OCR reader, including automatically checking of results in a name/address data bank and, in case they do not coincide, in another data bank where forwarding requests relative to delivery points are stored, wherein only the sender address is read in case of a determination of a return notation made by a delivery person on the mail item;
   evaluating recipient names and recipient addresses that are not clearly read by the OCR reader, including checking the name/address data bank, and the data banks for forwarding with the aid of video coding of the images of each item of mail for which at least one forwarding instruction exists for possible deliver points, by taking into account the forwarding or return instructions; said evaluating step including:
   transmitting the images of the items, not read with certainty in the automatic OCR evaluation, to a first video coding;
   feeding of those images, which were not evaluated with certainty during the video coding, to another automatic evaluation in the OCR reader by taking into accounting the results of the first video coding; and
   evaluating images of items not evaluated with certainty during the further automatic evaluation, said items containing at least one forwarding instruction for possible delivery points, during another video coding by using the results from the additional automatic evaluation;
   printing, legibly and encoded, a new recipient address, and forwarding instructions on the mail items leaving the intermediate storage; and
   distributing the mail items according to the new address and the following instructions.

* * * * *